(12) United States Patent
Kawajiri

(10) Patent No.: US 10,427,425 B2
(45) Date of Patent: Oct. 1, 2019

(54) PRINTER AND CONTROL METHOD OF A PRINTER

(71) Applicant: SEIKO EPSON CORPORATION, Tokyo (JP)

(72) Inventor: Masahiro Kawajiri, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/923,757

(22) Filed: Mar. 16, 2018

(65) Prior Publication Data

US 2018/0281470 A1 Oct. 4, 2018

(30) Foreign Application Priority Data

Mar. 28, 2017 (JP) ................. 2017-062537

(51) Int. Cl.
| | | |
|---|---|---|
| *B41J 11/00* | (2006.01) | |
| *B41J 3/407* | (2006.01) | |
| *B41J 15/02* | (2006.01) | |
| *B41J 15/04* | (2006.01) | |
| *B65H 16/06* | (2006.01) | |

(Continued)

(52) U.S. Cl.
CPC ......... *B41J 11/0095* (2013.01); *B41J 2/1606* (2013.01); *B41J 3/4075* (2013.01); *B41J 15/02* (2013.01); *B41J 15/046* (2013.01); *B65H 16/026* (2013.01); *B65H 16/06* (2013.01); *B65H 20/02* (2013.01); *B65H 23/044* (2013.01); *B65H 23/185* (2013.01); *B41J 2/15* (2013.01); *B65H 2404/143* (2013.01); *B65H 2511/112* (2013.01); *B65H 2513/11* (2013.01); *B65H 2553/412* (2013.01); *B65H 2701/194* (2013.01); *B65H 2801/06* (2013.01); *B65H 2801/15* (2013.01);

(Continued)

(58) Field of Classification Search
CPC ...... B41J 11/0095; B41J 29/393; B41J 29/38; B41J 2/1606; B41J 3/4075; B41J 15/02; B41J 2/15; B41J 20/02; B65H 16/026; B65H 16/06; B65H 23/044; B65H 23/185

See application file for complete search history.

(56) References Cited

U.S. PATENT DOCUMENTS

| | | | |
|---|---|---|---|
| 2004/0155141 A1 | 8/2004 | Tokunaga | |
| 2013/0222457 A1 | 8/2013 | Nakada et al. | |
| 2014/0192108 A1* | 7/2014 | Horaguchi | B41J 11/007 |
| | | | 347/16 |

FOREIGN PATENT DOCUMENTS

| | | |
|---|---|---|
| JP | 11-157716 A | 6/1999 |
| JP | 2004-142171 A | 5/2004 |
| JP | 2013-173281 A | 9/2013 |

* cited by examiner

*Primary Examiner* — Jannelle M Lebron
(74) *Attorney, Agent, or Firm* — Foley & Lardner LLP

(57) ABSTRACT

Provided is a printer that can appropriately handle a paper (media) wound into a roll with one end of the paper affixed to a core, when the trailing end of the paper is detected, the trailing end of the paper being attached to the winding core in multiple ways. The printer has: a roll paper support that supports the core of a roll of paper; a roll driver that turns the core and delivers the paper; a conveyance device that conveys the delivered paper; a tension detection switch that outputs a first detection value when tension produced on the paper delivered from the roll is greater than or equal to a threshold; and a controller that drives the roll driver in the direction delivering the paper when the output of the tension detection switch changes to the first detection value in response to rotation of the core.

7 Claims, 5 Drawing Sheets

(51) Int. Cl.
  *B65H 20/02* (2006.01)
  *B65H 16/02* (2006.01)
  *B41J 2/16* (2006.01)
  *B65H 23/04* (2006.01)
  *B65H 23/185* (2006.01)
  *B41J 2/15* (2006.01)
  *H04N 1/00* (2006.01)
(52) U.S. Cl.
  CPC ..... *H04N 1/00037* (2013.01); *H04N 1/00082* (2013.01); *H04N 1/00673* (2013.01)

PRINTER AND CONTROL METHOD OF A PRINTER

CROSS-REFERENCE TO RELATED APPLICATION

The present application claims priority to Japanese Application No. 2017-062537, filed on Mar. 28, 2017, which is hereby incorporated by reference in Its entirety.

BACKGROUND

The present invention relates to a printer and a control method of a printer.

Printers (image forming devices) that store paper (rolled media) wound into a roll with one end of the paper affixed to a winding core, detect the trailing end of the paper, and execute an appropriate process are known from the literature. See, for example, JP-A-2013-173281.

SUMMARY

There are basically two types of rolls that may be stored in the printer. One type of roll has the end of the paper (medium) affixed firmly to the core so that when force working to separate the trailing end of the paper from the core acts on the trailing end, the trailing end of the paper remains attached to the core in resistance to this force of separation. The other type of paper roll has the trailing end attached to the core in a way enabling this force of separation to separate the trailing end from the core. As a result, there is a need for the printer to appropriately handle multiple ways in which the trailing end of the paper may be attached to the core when the trailing end of the paper is detected.

The present disclosure is directed to this problem, and one objective of certain embodiments is to enable a printer to appropriately handle a paper (media) wound into a roll with one end of the paper affixed to a winding core, when the trailing end of the paper is detected, the trailing end of the paper being attached to the winding core in multiple ways.

According to one embodiment, a printer includes: a roll paper support configured to support a core of a roll of paper, the paper being wound with an end thereof attached to the core; a roll driver configured to rotate the core supported on the roll paper support and deliver the paper from a delivery point; a conveyance device configured to convey the paper delivered from the delivery point; a detection device configured to output a first detection value when tension produced on the paper delivered from the roll is greater than or equal to a threshold, and otherwise output a second detection value; and a controller configured to drive the roll driver in the direction delivering the paper from the core when the output of the detection device changes from the second detection value to the first detection value in response to rotation of the core by the roll driver.

Thus comprised, after the output of the detection device changes from the second detection value to the first detection value, the controller turn the core instead of stopping rotation of the core. After the output of the detection device changes from the second detection value to the first detection value, how the output of the detection device while turning the core depends on how the paper is attached to the core. Therefore, based on change in the output of the detection device thereafter, the controller appropriately detects how the paper is attached to the core. More specifically, when the end of the paper is detected, this configuration enables a printer holding roll paper wound with one end of the paper affixed to a core to execute a process appropriate to multiple ways the paper may be affixed to the core.

In a printer according to another embodiment, the detection device starts outputting the first detection value when the core is turned an additional specific amount by the roll driver after an attachment point, which is the position where the end of the paper is affixed to the core, and the delivery point become same position as a result of rotation of the core by the roll driver, the attachment point being the position where the end of the paper is affixed to the core; and then outputs the first detection value while the end of the paper is attached to the attachment point of the core, and outputs the second detection value after the end is released from the core.

Thus comprised, the controller, using a characteristic of the detection device, can appropriately detect how the paper is attached to the core Ra.

A printer according to another embodiment also has a printing mechanism configured to print on the paper conveyed by the conveyance device by a printhead, the printhead being disposed to the conveyance path through which the paper is conveyed; the controller stopping printing by the printing mechanism after the output of the detection device changes from the second detection value to the first detection value.

Thus comprised, rotation of the core can be prevented from affecting printing by the printing device when the roll driver is driven to turn the core in the direction delivering the paper after the output of the detection device changes from the second detection value to the first detection value.

In a printer according to another embodiment, the controller, when the output of the detection device changes from the second detection value to the first detection value, controls the roll driver to rotate the core a first amount, and resumes printing by the printing mechanism if output of the detection device changes from the first detection value to the second detection value before the core rotates the first amount.

Thus comprised, because the output of the detection device changes from the first detection value to the second detection value when the end of the paper separates from the core and printing by the printing device can continue, the printing device can continue printing and suppress paper waste.

In a printer according to another embodiment, the controller, when the output of the detection device changes from the second detection value to the first detection value, if the output of the detection device does not change by rotation of the first amount, reports a no-paper state.

Thus comprised, the controller can quickly report that printing is not possible when printing by the printing mechanism cannot continue.

In a printer according to another embodiment, the controller, when the output of the detection value to the first detection value, if the output of the detection device does not change by rotation of the first amount, retracts the printhead.

Thus comprised, the controller can quickly retract the printhead when printing by the printing mechanism cannot continue.

In another embodiment, a control method of a printer having a roll paper support configured to support a core of a roll of paper, the paper being wound with an end thereof attached to the core; a roll driver configured to rotate the core supported on the roll paper support and deliver the paper from a delivery point; and a conveyance device configured to convey the paper delivered from the delivery point; the control method includes: driving the roll driver in the direction delivering the paper from the core when the output of a detection device configured to output a first detection value when tension produced on the paper delivered from the roll is greater than or equal to a threshold, and otherwise output a second detection value, changes from the second detection value to the first detection value in response to rotation of the core by the roll driver.

Thus comprised, after the output of the detection device changes from the second detection value to the first detection value, the controller can turn the core instead of stopping rotation of the core, and based on change in the output of the detection device thereafter, appropriately detect how the paper is attached to the core. More specifically, when the end of the paper is detected, this configuration enables a printer holding roll paper wound with one end of the paper affixed to a core to execute a process appropriate to multiple ways the paper may be affixed to the core.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the invention is described below with reference to the accompanying figures.

Figure 1:
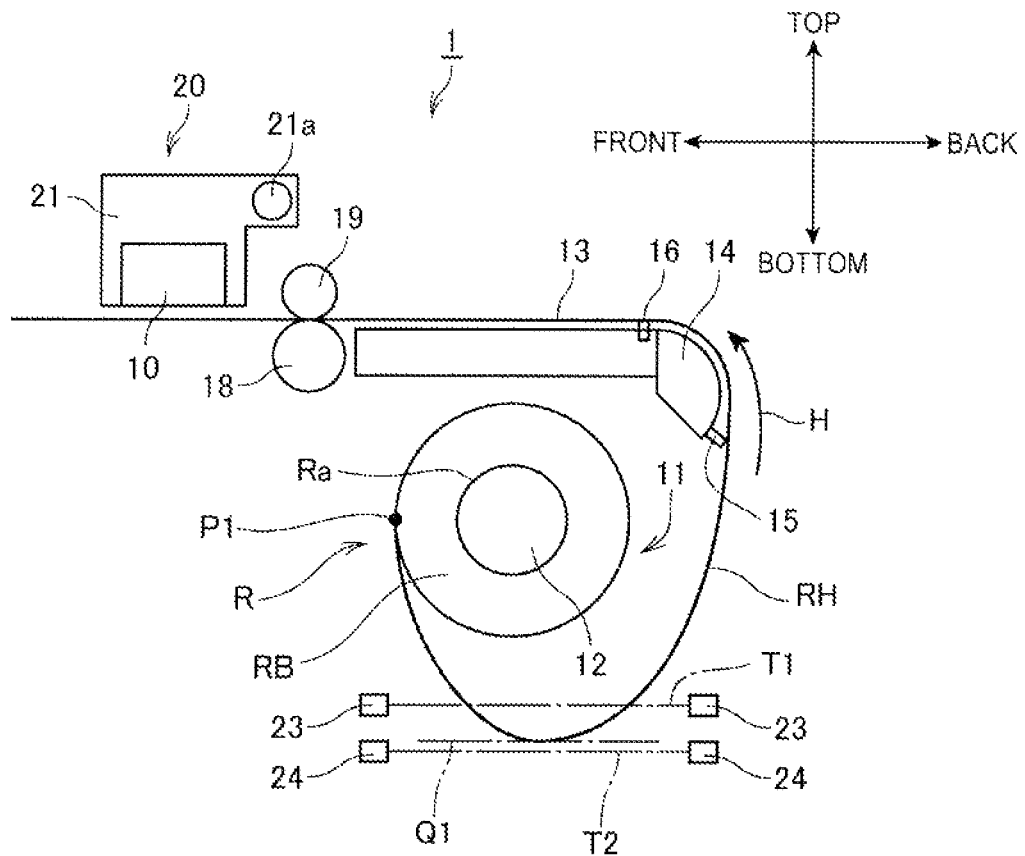
FIG. 1 schematically illustrates the configuration of main parts of the printer.

FIG. 1 schematically illustrates the configuration of main parts of the printer 1.

As indicated by the arrows in FIG. 1 and other figures, the direction to the left side of the figure is to the front of the printer 1 and the direction to the right side of the figure is to the back, the direction to the top side of the figure is to the top of the printer 1 and the direction to the bottom side of the figure is to the bottom.

The printer 1 in this example is a serial inkjet printer. The printer 1 stores roll paper R (a roll, paper), which is simply paper wound in a roll, and delivers and conveys the roll paper R from the paper roll in the conveyance direction H. The roll paper R is wound into a roll with one end of the paper affixed to a core Ra. The printer 1 prints by ejecting ink onto the conveyed roll paper R from an inkjet head 10 (printhead) configured as a serial printhead.

As shown in FIG. 1, the printer 1 has a roll paper compartment 11 in which the roll paper R is held. The portion of the roll paper R wound into a roll and stored in the roll paper compartment 11 is referred to below as the paper roll RB (roll), and the portion of the roll paper R that is unrolled and delivered from the paper roll RB in the roll paper compartment 11 is referred to as the unrolled paper RH (paper).

As shown in FIG. 1, a spindle 12 (roll paper support) is fit through the tubular core Ra disposed in the center of the paper roll RB inside the roll paper compartment 11. The spindle 12 supports the paper roll RB by way of the core Ra. The spindle 12 is connected through a power transfer mechanism (not shown in the figure) to the drive shaft of a delivery motor 31a described below, and turns as driven by the delivery motor 31a. As a result, the paper roll RB turns in conjunction with rotation of the spindle 12, and unrolled paper RH is delivered from the paper roll RB.

As shown in FIG. 1, a conveyance path 13 through which the unrolled paper RH is conveyed is formed in the printer 1. The unrolled paper RH delivered from the paper roll RB is conveyed through the conveyance path 13 in the conveyance direction H.

As shown in FIG. 1, a guide member 14 is disposed to the conveyance path 13. The guide member 14 contacts the back side of the unrolled paper RH, and causes the unrolled paper RH that is delivered in the upward direction to curve to the front. By contacting and causing the unrolled paper RH to curve, the guide member 14 applies tension to the unrolled paper RH, and suppresses development of undesired slack in the unrolled paper RH.

A tension detection switch 15 (detection device) is disposed to the bottom part of the guide member 14. The tension detection switch 15 has a mechanical switch, outputs a first detection value while this switch is pushed (referred to below as depressed), and outputs a second detection value when the sensor is not depressed (referred to below as released). The tension detection switch 15 is described further below.

A paper detection sensor 16 is disposed downstream from the guide member 14 in the conveyance direction H. The paper detection sensor 16 is an optical sensor, and outputs different detection values to the controller 30 (FIG. 2) when the unrolled paper RH is at, and when the unrolled paper RH is not at, the detection position of the paper detection sensor 16. Based on the detection value input from the paper detection sensor 16, the controller 30 detects when the trailing end of the unrolled paper RH has reached the detection position of the paper detection sensor 16. The paper detection sensor 16 may alternatively be a mechanical switch.

Downstream from the paper detection sensor 16 in the conveyance direction H is disposed a conveyance roller 18, and opposite the conveyance roller 18 is a driven roller 19. The unrolled paper RH is held between the conveyance roller 18 and driven roller 19, and is conveyed in the conveyance direction H as the conveyance roller 18 turns. The conveyance roller 18 is connected through a power transfer mechanism (not shown in the figure) to the drive shaft of the conveyance motor 32a described below (FIG. 2), and rotates as driven by the conveyance motor 32a.

A printing mechanism 20 is disposed downstream in the conveyance direction H from the conveyance roller 18.

The printing mechanism 20 includes a carriage 21, and an inkjet head 10 mounted on the carriage 21.

The carriage 21 is supported on a carriage rail 21a extending in the scanning direction perpendicular to the conveyance direction H, and moves the inkjet head 10 in the scanning direction along the carriage rail 21a.

The inkjet head 10 in this example has nozzle rows for multiple colors of ink, such as the four colors cyan (C), yellow (Y), magenta (M), black (K). The inkjet head 10 prints by ejecting ink supplied from ink cartridges not shown from nozzles formed in nozzle rows, forming dots on the unrolled paper RH.

As shown in FIG. 1, vertically below the roll paper compartment 11 is disposed a first slack detection sensor 23, and a second slack detection sensor 24 is disposed below the first slack detection sensor 23.

The first slack detection sensor 23 is an optical sensor, and outputs different detection values to the controller 30 when the unrolled paper RH is at detection position T1 and when the unrolled paper RH is not at the detection position T1. The second slack detection sensor 24 is also an optical sensor, and outputs different detection values to the controller 30 when the unrolled paper RH is at detection position T2, which is lower than detection position T1, and when the unrolled paper RH is not at the detection position T2.

Processing by the controller 30 (FIG. 3) based on input from the first slack detection sensor 23 and second slack detection sensor 24 is described below.

Figure 2:
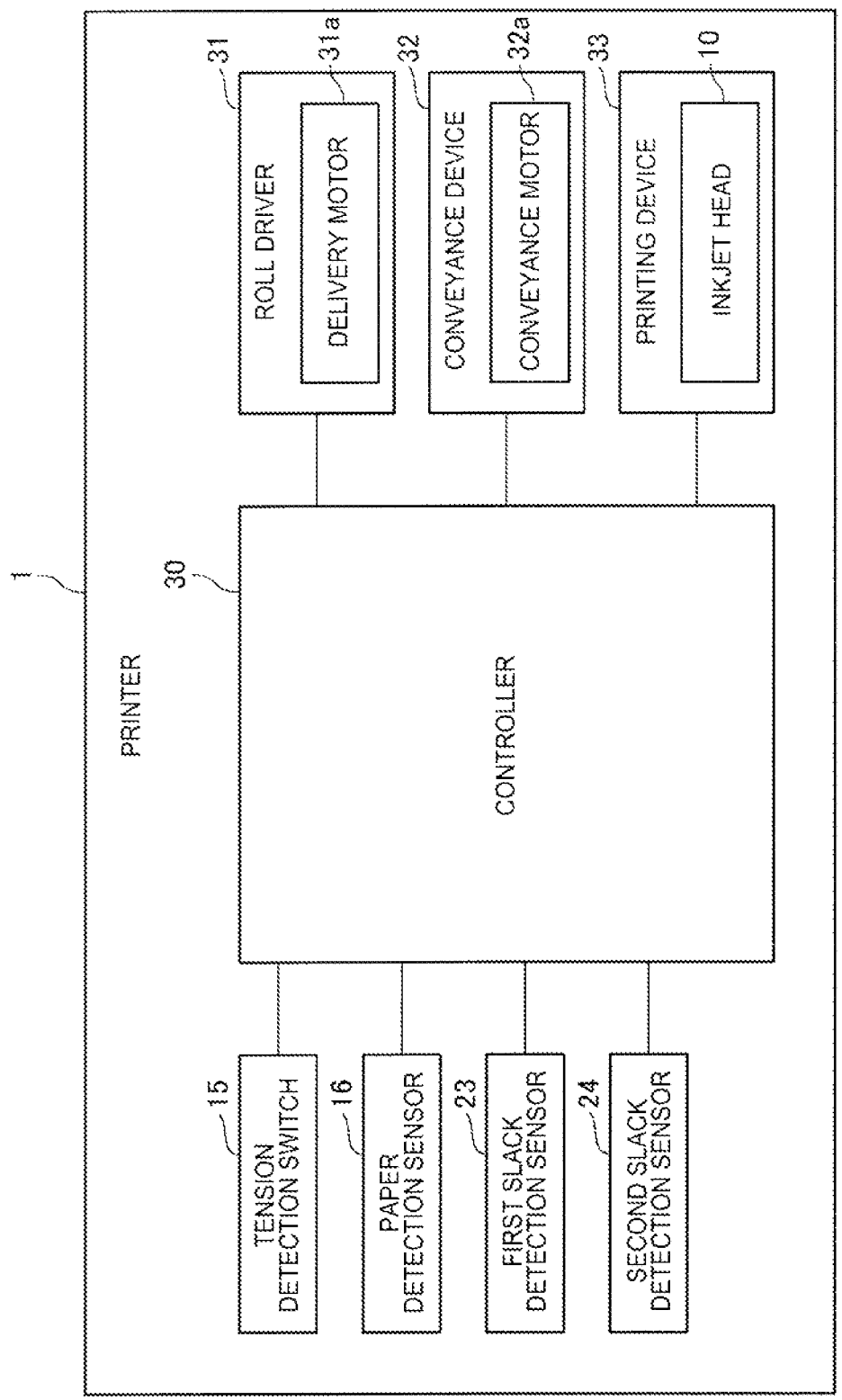
FIG. 2 is a block diagram illustrating the functional configuration of the printer.

FIG. 2 is a block diagram illustrating the functional configuration of the printer 1.

As shown in FIG. 2, the printer 1 has a controller 30, roll driver 31, conveyance device 32, and printing device 33.

The controller 30 includes a CPU, ROM, RAM, ASIC, and other signal processing circuits not shown, and controls other parts of the printer 1. The controller 30 executes processes by the cooperation of hardware and software, such as a CPU reading a program from ROM to RAM and running the program, or by executing processes through functions embodied in an ASIC, or by executing processes by a signal processing circuit processing signals.

Detection values from the tension detection switch 15, paper detection sensor 16, first slack detection sensor 23 and second slack detection sensor 24 are input to the controller 30.

The roll driver 31 includes elements related to turning the spindle 12. The roll driver 31 includes, as elements related to turning the spindle 12, a delivery motor 31a, the power transfer mechanism that transfers drive power from the delivery motor 31a to the spindle 12, and a motor driver that drives the delivery motor 31a. The roll driver 31, as controlled by the controller 30, drives the delivery motor 31a, causing the spindle 12 and the core Ra supported by the spindle 12 to turn, and delivers unrolled paper RH from the paper roll RB.

The conveyance device 32 includes elements related to conveying the unrolled paper RH. As elements related to conveying the unrolled paper RH, the conveyance device 32 includes the conveyance motor 32a, the power transfer mechanism that transfers drive power from the conveyance motor 32a to the conveyance roller 18, and a motor driver that drives the conveyance motor 32a. The conveyance device 32, as controlled by the controller 30, drives the conveyance motor 32a to turn the conveyance roller 18, and convey the unrolled paper RH delivered from the paper roll RB.

The printing device 33 includes elements related to printing. As elements related to printing, the printing device 33 includes the inkjet head 10 and carriage 21. The printing device 33, as controlled by the controller 30, forms dots by means of the inkjet head 10 to print images on the unrolled paper RH conveyed by the conveyance device 32.

The roll paper R is made by affixing one end of the paper to the core Ra, and then winding the paper onto the core Ra. The end of the paper may be attached to the core Ra using either of two methods as described below.

The first method leaves the trailing end of the paper attached to the core in resistance to the force of separation when force working to separate the trailing end of the paper from the core acts on the trailing end. In this first method, an adhesive is used to strongly bond the end of the paper to the core Ra.

The second method allows the trailing end of the paper to be separated from the core Ra by the force of separation when force working to separate the trailing end of the paper from the core acts on the trailing end. This second method may attach the trailing end of the paper to the core Ra with a piece of tape, for example.

When the trailing end of the roll paper R is detected, a printer 1 according to the invention executes a process for appropriately handling these two methods of attaching the trailing end of the paper to the core Ra. The operation of the printer 1 is described next.

The operating states of the printer 1 include a first state and a second state.

The first state is the state in which there is sufficient paper remaining on the paper roll RB, and the printer 1, as controlled by the controller 30, can position the unrolled paper RH below detection position T1.

The second state is the state in which there is not enough paper left on the paper roll RB for the printer 1 to set the unrolled paper RH below the detection position T1, and the printer 1, as controlled by the controller 30, cannot cause the unrolled paper RH to drape below the detection position T1. Note that the state of the printer 1 immediately after roll paper R with sufficient label paper left is installed in the printer 1 is the first state, and as the unrolled paper RH is delivered from the paper roll RB of the roll paper R, the state of the printer 1 goes from the first state to the second state.

Operation of the printer 1 when the printer 1 is in the first state, conveying roll paper R, and printing on the roll paper R is described first.

When printing with the state of the printer 1 in the first state, the controller 30 controls the printing device 33 and conveyance device 32 to execute the following process. More specifically, the controller 30 controls the printing device 33 to execute pass printing with the inkjet head 10, which is a serial printhead, and controls the conveyance device 32 to convey the unrolled paper RH a specific amount in the conveyance direction H timed to the timing of pass printing by the inkjet head 10. By alternating pass printing and conveying the unrolled paper RH synchronized to printing, an image is sequentially printed on the unrolled paper RH.

Parallel to conveyance of the unrolled paper RH by the conveyance device 32, the controller 30 also executes the following process. That is, the controller 30 controls the roll driver 31 to turn the spindle 12 and deliver paper RH unrolled from the delivery point P1 (see FIG. 1) of the paper roll RB. As a result, the delivery point P1 is the position at which the unrolled paper RH separates from the rolled paper roll RB and is unrolled (delivered) according to rotation of the spindle 12. The unrolled paper RH separates from the outside circumference of the paper roll RB at the delivery point P1, and is conveyed by the conveyance device 32 through the conveyance path 13.

During delivery of the unrolled paper RH, the controller 30 manages the vertical relationship between the lowest position Q1 (see FIG. 1) of the unrolled paper RH, and detection position T1 and detection position T2, based on the detection value input from the first slack detection sensor 23 and the detection value input from the second slack detection sensor 24.

The lowest position Q1 is the lowest position to which the unrolled paper RH descends in the portion of the unrolled paper RH between the delivery point P1 and guide member 14. The controller 30 controls the roll driver 31 and adjusts the length of unrolled paper RH delivered from the paper roll RB so that the lowest position Q1 is kept at a position vertically below detection position T1 and vertically above detection position T2 (that is, between detection position T1 and detection position T2).

By keeping the lowest position Q1 below detection position T1 and above detection position T2, desired slack is produced in the unrolled paper RH between the delivery point P1 and guide member 14. As a result, the friction that works between the rollers and the unrolled paper RH, and is required for the conveyance roller 18 and driven roller 19 to normally convey the unrolled paper RH, can be reduced, and slipping between the conveyance roller 18 and driven roller 19 can be prevented.

Operation of the printer 1 in the second state is described next.

Figure 3:
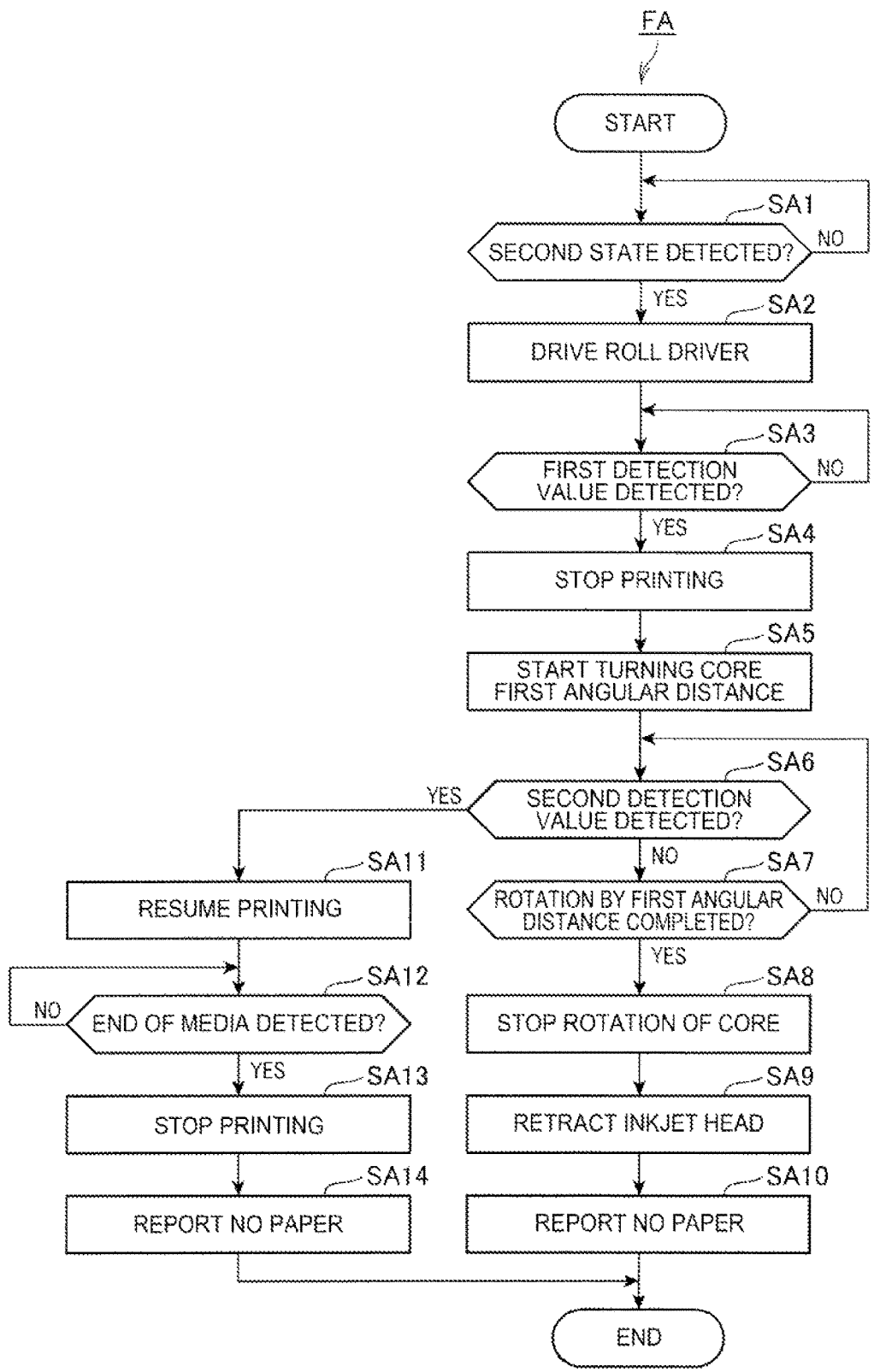
FIG. 3 is a flow chart describing printer operation.

The flow chart FA in FIG. 3 is a flow chart describing the operation of the printer 1. When the process shown in the flow chart FA starts, the state of the printer 1 is the first state, roll paper R is being conveyed, and the printer 1 is printing on the roll paper R.

As shown in the flow chart FA in FIG. 3, while conveying the roll paper R and printing on the roll paper R, the controller 30 of the printer 1 monitors whether or not the state of the printer 1 has changed from the first state to the second state (step SA1).

In step SA1, the controller 30 monitors whether or not the state of the printer 1 has changed from the first state to the second state by the process described below.

More specifically, as described above, in the first state, there is sufficient paper remaining on the paper roll RB, and the controller 30, by controlling the roll driver 31 to deliver unrolled paper RH from the paper roll RB, can maintain a state in which the unrolled paper RH is unrolled to the lowest position Q1, which is below the detection position T1.

In the second state, there is not enough paper left on the paper roll RB to keep the unrolled paper RH unrolled to the lowest position Q1 below the detection position T1, and the controller 30 cannot deliver paper RH unrolled from the paper roll RB to the lowest position Q1.

As a result, when the lowest position Q1 does not go below the detection position T1 even though the spindle 12 is driven at a specific speed after detecting that the lowest position Q1 of the unrolled paper RH is above the detection position T1 based on the detection value input from the first slack detection sensor 23, the controller 30 determines that the state of the printer 1 changed from the first state to the second state.

When the state of the printer 1 is detected to change from the first state to the second state (step SA1: YES), the controller 30 controls the roll driver 31 to turn the core Ra supported by the spindle 12 at a first speed of rotation (step SA2).

In this way, even though a change from the first state to the second state is detected, the controller 30 does not stop printing by the printing device 33 or conveyance by the conveyance device 32. The reason for this is described next.

That is, when the printer 1 changes from the first state to the second state, the amount of paper remaining on the paper roll RB is not sufficient to position the unrolled paper RH at the lowest position Q1 below the detection position T1, but is sufficient to produce the desired slack in the unrolled paper RH between the delivery point P1 and guide member 14. Therefore, the unrolled paper RH can be conveyed normally by the conveyance device 32 for a certain time after the printer 1 goes to the second state. As a result, the controller 30 does not stop printing by the printing device 33 or conveyance by the conveyance device 32 immediately when a change from the first state to the second state is detected.

The first speed of rotation is set appropriately based on tests or simulations to a speed that produces desirable slack in the unrolled paper RH between the delivery point P1 and guide member 14 after the second state is assumed.

After driving the spindle 12 at the first speed of rotation, the controller 30 monitors for the detection value input from the tension detection switch 15 to change from the second detection value to the first detection value (step SA3).

The process of step SA3 is described below in conjunction with description of the tension detection switch 15.

The process of step SA3 is described with reference to FIG. 4.

When the spindle 12 turns at the first speed of rotation, the delivery point P1 becomes coincident to the attachment point P2. The attachment point P2 is where the trailing end of the paper is attached to the core Ra. State J1 in FIG. 4 shows parts of the printer 1 immediately after the delivery point P1 becomes coincident to the attachment point P2 as the spindle 12 turns at the first speed of rotation.

After the delivery point P1 becomes coincident to the attachment point P2, the delivery point P1 and attachment point P2 remain coincident as the spindle 12 continues turning.

If rotation of the spindle 12 continues after the delivery point P1 becomes coincident to the attachment point P2, the tension on the unrolled paper RH between the delivery point P1 (=attachment point P2) and the guide member 14 reaches a specific threshold (referred to below as the tension threshold), and the tension detection switch 15, which is a mechanical switch, is pushed to the depressed state.

Figure 4:
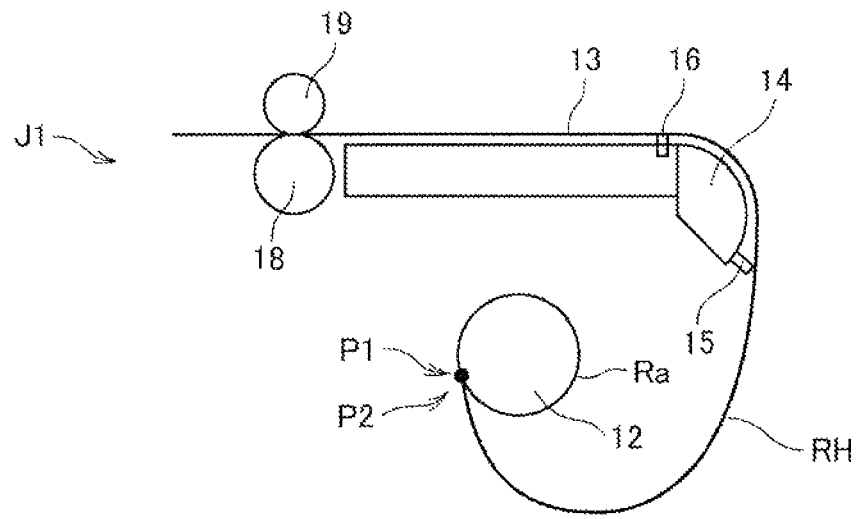
FIG. 4 is used to describe the process of step SA3 in the flow chart FA in FIG. 3.
Figure 4:
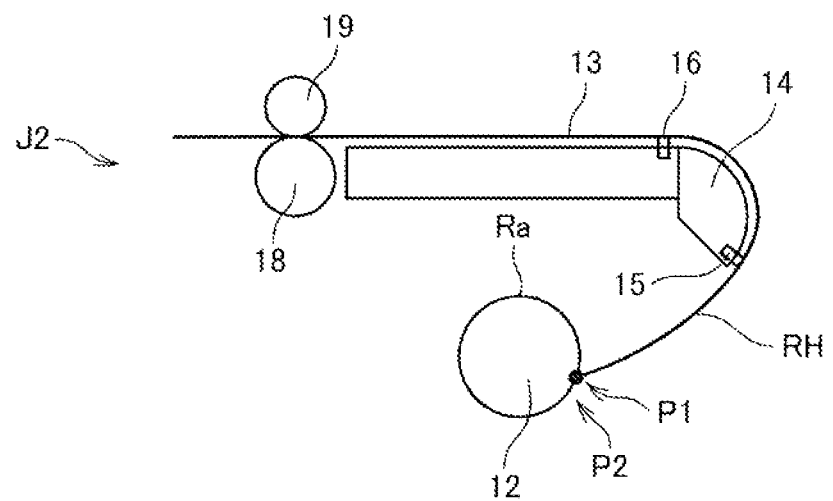

State J2 in FIG. 4 shows parts of the printer 1 immediately after the tension detection switch 15 is depressed. As described above, the tension detection switch 15 outputs the first detection value while depressed, and outputs the second detection value when released.

The tension threshold is a value indicating that there is slack in the unrolled paper RH between the delivery point P1 and guide member 14 when the tension on the unrolled paper RH is below the tension threshold. The tension threshold also indicates that when the tension on the unrolled paper RH exceeds the tension threshold by a specific amount, there is no slack in the paper. When slack in the unrolled paper RH between the delivery point P1 and guide member 14 disappears, force opposite the conveyance direction H is applied to the unrolled paper RH, and the unrolled paper RH cannot be conveyed normally by the conveyance device 32.

In other words, the tension detection switch 15 is disposed to a position where it will be depressed when the tension on the unrolled paper RH exceeds the tension threshold. Because the tension detection switch 15 is disposed to such a position, the tension detection switch 15 starts outputting the first detection value instead of the second detection value when the roll driver 31 turns the core Ra a specific amount after the delivery point P1 and attachment point P2 become coincident.

As shown in the flow chart FA in FIG. 3, when in step SA3 the detection value input from the tension detection switch 15 is detected to change from the second detection value to the first detection value (step SA3: YES), the controller 30 controls the printing device 33 and stops printing by the printing device 33 (step SA4). Note that if pass printing is in progress when the detection value input from the tension detection switch 15 changes from the second detection value to the first detection value, the controller 30 finishes printing that pass and then stops printing by the printing device 33. The inkjet head 10 in this embodiment is a serial printhead, the unrolled paper RH is not conveyed by the conveyance device 32 while printing a pass, and pass printing can therefore execute normally without being affected when the tension on the unrolled paper RH reaches the tension threshold.

Next, the controller 30 controls the roll driver 31 and starts turning the core Ra a first angular distance (first amount) (step SA5).

This first angular distance is set as described below. That is, the first angular distance is an amount at which, when the core Ra turns the first angular distance after the tension on the unrolled paper RH reaches the tension threshold, if the end of the paper is attached to the core Ra by the second method described above, the trailing end of the paper will be separated from the core Ra by the tension produced on the unrolled paper RH before rotation by the first angular distance is completed. As described above, when the trailing end of the paper is attached to the core Ra by the second method described above, the end of the paper separates from the core Ra when a specific force is applied to the paper.

After starting to turn the core Ra the first angular distance in step SA5, the controller 30 monitors for rotation of the core Ra by the first angular distance to end (step SA7) while also monitoring for the detection value input from the tension detection switch 15 to change from the first state to the second state (step SA6).

Figure 5:
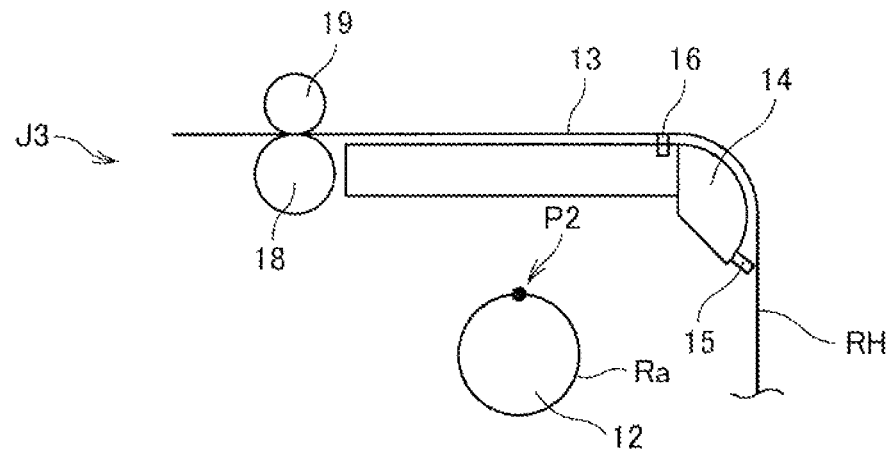
FIG. 5 is used to describe the process of step SA7 in the flow chart FA in FIG. 3.
Figure 5:
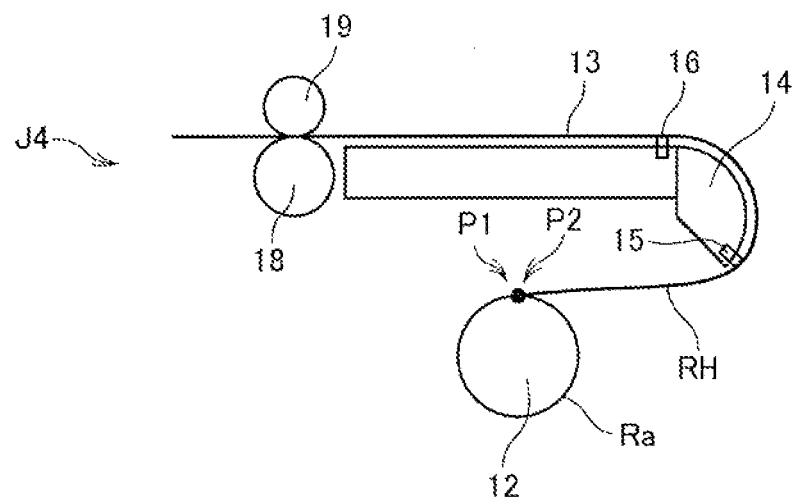

FIG. 5 is used to describe the process of step SA7.

If the detection value input from the tension detection switch 15 to change from the first state to the second state before the core Ra finishes turning the first angular distance (step SA6: YES), the printer 1 will be as described below. That is, the end of the paper is attached to the core Ra by the second method, the end of the paper is therefore separated from the core Ra before the core Ra finishes turning the first angular distance, and, as a result, the state of the tension detection switch 15 changes from the depressed state to the released state.

State J3 in FIG. 5 illustrates parts of the printer 1 immediately after the detection value input from the tension detection switch 15 changes from the first detection value to the second detection value. As shown in state J3 in FIG. 5, when the detection value input from the tension detection switch 15 changes from the first detection value to the second detection value, the end of the paper is separated from the core Ra. As a result, the tension detection switch 15 changes from the depressed state to the released state. When the tension detection switch 15 changes to the released state, the detection value input from the tension detection switch 15 changes from the first detection value to the second detection value.

If the core Ra turns the complete first angular distance (step SA7: YES) without the detection value input from the tension detection switch 15 changing from the first detection value to the second detection value (step SA6: NO), the printer 1 is as described below. That is, the end of the paper is attached to the core Ra by the first method, the end of the paper therefore remains attached to the core Ra even though the core Ra has turned the full first angular distance, and, as a result, the tension detection switch 15 remains in the depressed state.

State J4 in FIG. 5 illustrates parts of the printer 1 immediately after the core Ra finishes turning the first angular distance without the detection value input from the tension detection switch 15 changing from the first detection value to the second detection value. As shown in state J4 in FIG. 5, the end of the paper remains attached to the core Ra in this state. As a result, the tension detection switch 15 remains depressed. The tension detection switch 15 therefore continues outputting the first detection value when the core Ra has turned the first angular distance.

As shown in the flow chart FA in FIG. 3, when the core Ra finishes turning the first angular distance without the detection value input from the tension detection switch 15 changing from the first detection value to the second detection value (step SA7: YES), the controller 30 controls the roll driver 31 to stop turning the core Ra (step SA8).

Next, the controller 30 moves the inkjet head 10 to the home position and caps the inkjet head 10 (step SA9). The process of step SA9 effectively suppresses drying of the inkjet head 10.

Next, the controller 30 reports a no-paper error (step SA10). A no-paper error means that printing is not possible because there is not enough paper. The process of step SA10 may be executed by the following method. For example, if the printer 1 has a display, the printing mechanism 20 may report a no-paper error by displaying on the display information indicating that a no-paper state was detected. Alternatively, if the printer 1 has an audio output means (such as a speaker), the controller 30 may report a no-paper error by audio output of information indicating that a no-paper state was detected. Further alternatively, if the printer 1 is connected to an external device, the controller 30 may report a no-paper error by communicating with the external device, sending the required information to the external device, and indicating there is no paper through the display or audio output device of the external device.

However, if the detection value input from the tension detection switch 15 changes from the first state to the second state before the core Ra finishes turning the first angular distance, the controller 30 resumes printing by the printing device 33 and conveyance by the conveyance device 32 (step SA11).

When the process of step SA11 executes, the end of the roll paper R has been separated from the core Ra. As a result, tension (force pulling the unrolled paper RH in the opposite direction as the conveyance direction H) produced by the unrolled paper RH being delivered from the paper roll RB is not produced, and the conveyance device 32 can convey the paper normally.

After printing by the printing device 33 and conveyance by the conveyance device 32 resume, the controller 30, based on the detection value input from the paper detection sensor 16, monitors for the trailing end of the unrolled paper RH reaching the detection position of the paper detection sensor 16 (step SA12). If the end of the unrolled paper RH reaches the detection position of the paper detection sensor 16, the controller 30 knows the remaining paper is insufficient.

If the controller 30 detects the trailing end of the unrolled paper RH at the detection position of the paper detection sensor 16 (step SA12: YES), the controller 30 stops printing by the printing device 33 and conveyance by the conveyance device 32 (step SA13).

Next, the controller 30 reports a no-paper error (step SA14).

When the trailing end of the unrolled paper RH is detected to reach the detection position of the paper detection sensor 16, the controller 30 of the printer 1 according to this embodiment applies control stopping printing by the printing device 33 and conveyance by the conveyance device 32, but the invention is not so limited. For example, the printed length of the job to print may be compared with the length to the end of the paper, and if printing the job can be completed, printing by the printing device 33 and conveyance by the conveyance device 32 may be stopped after printing the job.

As described above, when the end of the paper is attached to the core Ra by the second method described above, this embodiment of the invention can appropriately detect, based on the detection result from the tension detection switch 15, that the end of the paper is attached by the second method. Printing images to the roll paper R can also continue until the end of the unrolled paper RH reaches the detection position of the paper detection sensor 16. This configuration reduces the area that is not printed on the roll paper R, and thereby suppresses roll paper R waste.

As described above, a printer 1 according to the invention has a spindle 12 that supports the core Ra of a paper roll RB (roll) of paper wound with one end attached to a core Ra. The printer 1 also has a roll driver 31 that turns the core Ra supported by the spindle 12 and delivers paper from the delivery point P1. The printer 1 also has a conveyance device 32 that conveys the unrolled paper RH (paper) delivered from the delivery point P1. The printer 1 also has a printing device 33 that prints on the unrolled paper RH conveyed by the conveyance device 32 by means of an inkjet head 10 disposed to the conveyance path 13 through which the paper is conveyed. The printer 1 also has a tension detection switch 15 (detection device) that outputs a first detection value when the tension applied to the unrolled paper RH delivered from the paper roll RB and conveyed by the conveyance device 32 exceeds a tension threshold (threshold), and otherwise outputs a second detection value. The printer 1 also has a controller 30 that, when the detection value output from the tension detection switch 15 changes from a second detection value to a first detection value in response to rotation of the core Ra by the roll driver 31, causes the roll driver 31 to turn the core Ra in the direction delivering unrolled paper RH.

Thus comprised, after the output of the tension detection switch 15 changes from the second detection value to the first detection value, the controller 30 turns the core Ra instead of stopping rotation of the core Ra. As described above, after the output of the tension detection switch changes from the second detection value to the first detection value, how the output of the tension changes while turning the core Ra depends on how the paper is attached to the core Ra. Therefore, based on change in the output of the tension detection switch 15 thereafter, the controller 30 appropriately detects how the paper is attached to the core Ra. More specifically, when the end of the paper is detected, a printer 1 holding roll paper R wound with one end of the paper affixed to a core Ra can execute a process appropriate to multiple methods of affixing the end of the paper to the core Ra, referred to herein as a first method and a second method.

In this embodiment of the invention, the attachment point p2, which is the position where the end of the paper is affixed to the core Ra, and the delivery point P1 become same position as a result of rotation of the core Ra by the roll driver 31. The tension detection switch 15 starts outputting the first detection value when the core Ra is turned a specific amount by the roll driver 31 after the attachment point P2 and the delivery point P1 become same position; and then outputs the first detection value while the end of the paper is attached to the attachment point P2 of the core Ra, and outputs the second detection value after the end is released from the core Ra.

Thus comprised, the controller 30, using a characteristic of the tension detection switch 15, can appropriately detect how the paper is attached to the core Ra.

Furthermore, when the output of the tension detection switch 15 changes from the second detection value to the first detection value, the controller 30 in this embodiment of the invention stops printing by the printing device 33.

Thus comprised, rotation of the core Ra can be prevented from affecting printing by the printing device 33 when the roll driver 31 is driven to turn the core Ra in the direction delivering the unrolled paper RH after the output of the tension detection switch 15 changes from the second detection value to the first detection value.

Furthermore, when the output of the tension detection switch 15 changes from the second detection value to the first detection value, the controller 30 in this embodiment of the invention drives the roll driver 31 to turn the core Ra a first angular distance (first amount), and resumes printing by the printing device 33 if, before rotation of the first angular distance ends, the output of the tension detection switch 15 changes from the first detection value to the second detection value.

Thus comprised, because the output of the tension detection switch 15 changes from the first detection value to the second detection value when the end of the paper separates from the core Ra and printing by the printing device 33 can continue, the printing device 33 can continue printing and suppress paper waste.

In this embodiment of the invention, the controller 30 reports there is no paper left if the output of the tension detection switch 15 does not change during rotation by the first angular distance.

Thus comprised, the controller 30 can quickly report when printing by the printing device 33 is not possible.

Furthermore, the controller 30 can retract the inkjet head 10 when there is no change in the output of the tension detection switch 15 during rotation by the first angular distance.

Thus comprised, the controller 30 can quickly retract the inkjet head 10 when printing by the printing device 33 is not possible.

The invention is described above with reference to a preferred embodiment thereof, but the invention is not limited thereto and can be modified and adapted in many ways without departing from the scope of the accompanying claims.

An inkjet printer is used as an example of the printer 1 in the foregoing embodiment, but the invention is not so limited to inkjet printers. More specifically, the invention can be broadly applied to many kinds of devices holding a roll of paper or other media having the trailing end thereof attached to a core Ra.

The function blocks described with reference to the accompanying figures are grouped according to the main content of the processes of the functional configurations of the devices to facilitate understanding the invention. The configuration of the devices may be divided into further elements according to the process content. A single functional element may also be configured to execute more processes. The processes of the component elements may also be executed by a single hardware component, or by multiple hardware components. Yet further, the processes of the component elements may be embodied by a single program, or by multiple programs.

The processing units of the flowcharts shown in the figures are divided according to the main content of the processes in order to facilitate understanding the processes of individual devices. The invention is not limited by the method of segmenting or naming the processing units. The processes of individual devices can be further divided, according to the process content, into more processing units. Alternatively, single processing units may be further divided into more processing units. Yet further, if the equivalent process can be executed, the order of the processes (steps) in the accompanying flow charts is also not limited to that shown in the figures.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer comprising:
   a roll paper support configured to support a core of a roll of paper, the paper being wound with an end thereof attached to the core;
   a roll driver configured to rotate the core supported on the roll paper support and deliver the paper from a delivery point;
   a conveyance device configured to convey the paper delivered from the delivery point;
   a detection device configured to output a first detection value when tension produced on the paper delivered from the roll is greater than or equal to a threshold, and otherwise output a second detection value;
   a controller configured to drive the roll driver in the direction delivering the paper from the core when the output of the detection device changes from the second detection value to the first detection value in response to rotation of the core by the roll driver, and
   a printing mechanism configured to print on the paper conveyed by the conveyance device by a printhead, the printhead being disposed to the conveyance path through which the paper is conveyed;
   the controller stopping printing by the printing mechanism after the output of the detection device changes from the second detection value to the first detection value.

2. The printer described in claim 1, wherein:
   the detection device starts outputting the first detection value when the core is turned an additional specific amount by the roll driver after an attachment point, which is the position where the end of the paper is affixed to the core, and the delivery point become same position as a result of rotation of the core by the roll driver, the attachment point being the position where the end of the paper is affixed to the core; and
   then outputs the first detection value while the end of the paper is attached to the attachment point of the core, and outputs the second detection value after the end is released from the core.

3. The printer described in claim 1,
   wherein the controller rotates the core by the roll driver a first amount after the output of the detection device changes from the second detection value to the first detection value.

4. The printer described in claim 3, wherein:
   the controller, when the output of the detection device changes from the second detection value to the first detection value, resumes printing by the printing mechanism if the output of the detection device changes from the first detection value to the second detection value before the core rotates the first amount.

5. The printer described in claim 3, wherein:
   the controller, when the output of the detection device changes from the second detection value to the first detection value, if the output of the detection device does not change by rotation of the first amount, reports a no-paper state.

6. The printer described in claim 3, wherein:
   the controller, when the output of the detection device changes from the second detection value to the first detection value, if the output of the detection device does not change by rotation of the first amount, retracts the printhead.

7. A control method of a printer having a roll paper support configured to support a core of a roll of paper, the paper being wound with an end thereof attached to the core; a roll driver configured to rotate the core supported on the roll paper support and deliver the paper from a delivery point; a conveyance device configured to convey the paper delivered from the delivery point; and a printing mechanism configured to print on the paper conveyed by the conveyance device by a printhead, the printhead being disposed to the conveyance path through which the paper is conveyed; the control method comprising:
   driving the roll driver in the direction delivering the paper from the core when the output of a detection device configured to output a first detection value when tension produced on the paper delivered from the roll is greater than or equal to a threshold, and otherwise output a second detection value, changes from the second detection value to the first detection value in response to rotation of the core by the roll driver; and
   stopping printing by the printing mechanism after the output of the detection device changes from the second detection value to the first detection value.

* * * * *